UNITED STATES PATENT OFFICE.

THOMAS W. MITCHELL, OF RICHMOND, TEXAS, ASSIGNOR TO HIMSELF AND ROBERT P. BRISCOE, OF SAME PLACE.

IMPROVEMENT IN COMPOUNDS FOR DESTROYING WORMS IN COTTON-PLANTS.

Specification forming part of Letters Patent No. 110,774, dated January ?, 1871.

*To all whom it may concern:*

Be it known that I, THOMAS W. MITCHELL, of Richmond, in the county of Fort Bend and State of Texas, have invented a new and Improved Composition for Destroying Worms on Cotton-Plants; and I do hereby declare the following to be a full, clear, and exact description of the same.

This invention has for its object the destruction of the cotton-worm; and this object is accomplished by sprinkling the plants on which the worm feeds with a solution of arsenic in water. The arsenic used for this purpose may be either of the opaque or transparent variety. Of the former, the proper proportion to one pint of water is ninety-two grains, and of the latter two hundred and ninety-three grains.

This solution is applied to the plants by means of an ordinary sprinkler. While it continues in liquid form it adheres to the surfaces of the leaves and stems, and is consequently partaken of by the worms and causes their death. By the time it becomes dry all the worms on the plant at the time of sprinkling are destroyed. The arsenic evaporates as the solution dries and passes off into the air, or is blown away, leaving no remnant of poisonous matter upon the plants. While, therefore, the arsenic solution is destructive to worm life, it does not render the plants dangerous to human beings.

Of course, this worm-destroyer may be applied to other plants as well as cotton.

Having thus described my invention, what I claim as new, and desire to secure by Letters Patent, is—

The improved solution herein described, prepared in the manner and in substantially the proportions herein set forth, so as to be used as specified.

TOM. W. MITCHELL.

Witnesses:
CHAS. A. PETTIT,
THOS. D. D. OURAND.